Jan. 7, 1930.  H. G. KAMRATH  1,742,769
AIR CLEANER
Filed Aug. 29, 1925
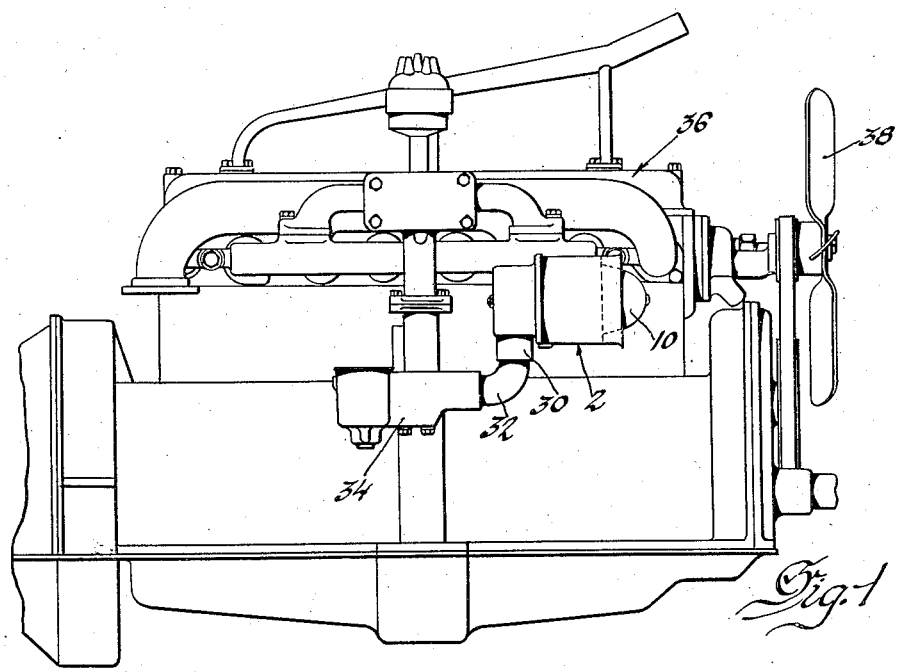
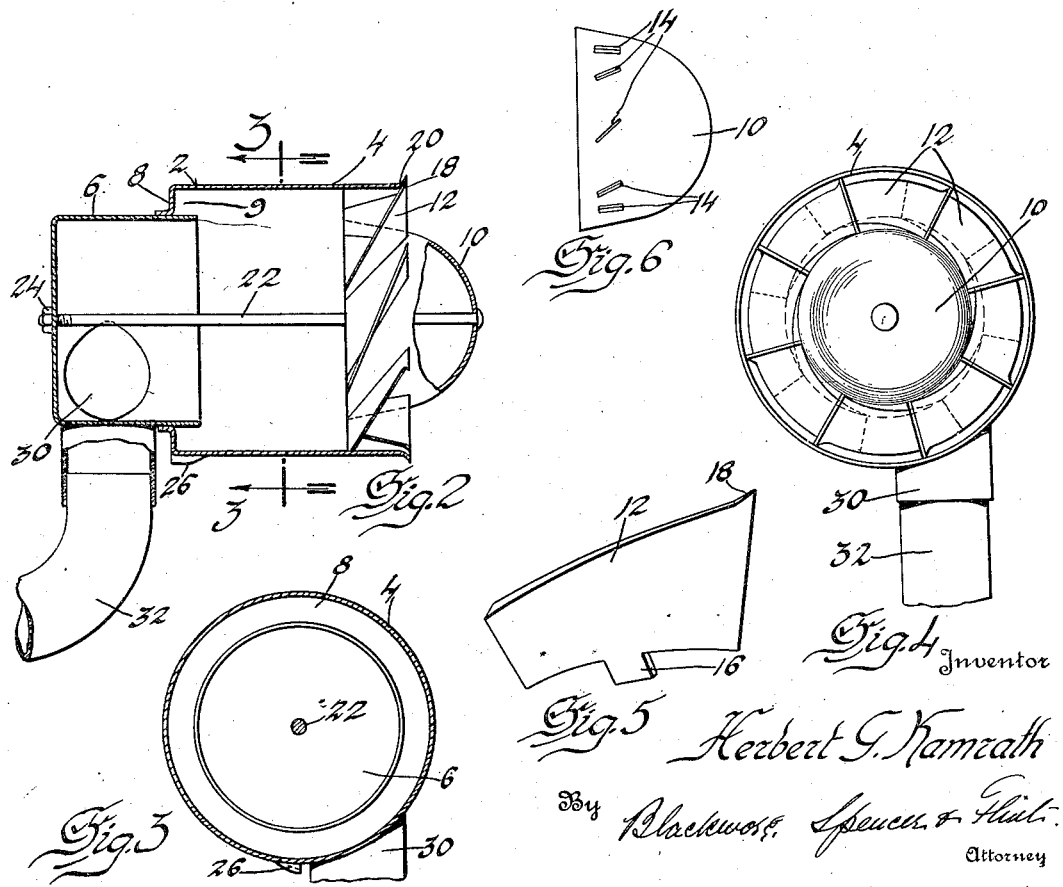

Patented Jan. 7, 1930

1,742,769

UNITED STATES PATENT OFFICE

HERBERT G. KAMRATH, OF FLINT, MICHIGAN, ASSIGNOR TO A C SPARK PLUG COMPANY, OF FLINT, MICHIGAN, A COMPANY OF MICHIGAN

AIR CLEANER

Application filed August 29, 1925. Serial No. 53,340.

In air cleaners of the type which have gone into extensive use in connection with the internal combustion engines of motor vehicles and wherein separation of dust particles is effected by taking advantage of their greater momentum resulting from their greater mass as compared with the mass of the molecules composing the air stream, it has heretofore been common practice to provide a dust receptacle for the collection of the foreign particles so separated. In very dusty regions these receptacles must be emptied with considerable frequency. To avoid this inconvenience I have devised an air cleaner in which the dust particles are automatically ejected after separation from the air stream. I have preferably embodied this improvement in a cleaner of the type in which the entering air stream performs a whirling motion between the inlet and the outlet, the dust particles being thrown to the periphery of the stream.

Specifically, I have devised an air cleaner which comprises a casing one end of which is open and preferably faces a blast of air such as is furnished by the usual automobile fan or which may be produced as a consequence of the motion of the vehicle. In the preferred form this casing comprises a part of large diameter provided with the open end referred to and a part of small diameter. A shield is centrally arranged in the open end, a series of air directing blades extending between the shield and the casing. Adjacent the junction of the two parts of the casing an outlet is provided for the ejection of the dust laden portions of the air stream, this outlet with the associated parts of the casing serving as a dust trap, thus preventing the entrance of dust into the portion of the casing which is of smaller diameter. This latter portion is provided with an air outlet which is preferably tangentially arranged. With this construction the entering air is deflected by the shield toward the periphery of the casing and upon striking the blades is deflected in a whirling stream which follows a spiral path through the casing to the air outlet. The trap previously referred to which is located between the inlet and outlet serves for the continuous discharge of dust particles.

I have also disclosed in this application a method of constructing an air cleaner of the type above described out of sheet metal and the resulting structural details constitute additional features of novelty.

Referring now to the drawings:

Figure 1 is a side elevation of a conventional automobile power plant showing my air cleaner applied thereto;

Figure 2 is a longitudinal sectional view through the cleaner;

Figure 3 is a section on line 3—3 of Figure 2;

Figure 4 is an end elevation of the cleaner; and

Figures 5 and 6 show details of construction.

The reference character 2 indicates the casing of my air cleaner which comprises a part 4 of large diameter and a part 6 of small diameter. This casing may, if desired, be made in two pieces as shown, the part 4 having an inwardly turned flange 8 receiving the part 6 which is of hollow cylindrical form, and preferably projects within the part 4 forming an annular trap 9 for the reception of dust particles. In the open end of the casing, shield 10 is provided, the shield being centered and spaced from the walls of the casing by the blades 12. While the shield and blades may be formed as an integral structure I have preferred to make them of sheet metal stampings, the shield being provided with a series of circumferentially arranged slots 14 and the blades being provided with tongues 16 adapted to enter the slots. The outer edges of the blades are also preferably provided with projecting portions 18 adapted to engage an outwardly turned lip 20 formed on the casing portion 4. A bolt 22 passes centrally through the casing, its head engaging the shield and its threaded end piercing the rear wall of the smaller portion 6 of the casing where it is provided with a nut 24 which, when drawn up, clamps the two parts of the cleaner in position. The annular trap 9 is provided with an outlet for the dust laden portions of the air stream. While this outlet may be formed at a number of different points in the path of the stream, as for instance in the flange 8, I have preferred to provide it in the cylindrical portion 4 adjacent the flange 8 as shown at 26. The outlet is formed by cutting and pressing outwardly a portion of the metal of the part 4. The portion 6 of the casing is provided with an outlet 30 for the cleansed air, this outlet being preferably tangentially arranged and being provided with a connection 32 to the carburetor.

In Figure 1 I have shown an air cleaner construction as described applied to the carburetor 34 of a conventional automobile power plant, indicated generally by the reference character 36, this power plant embodying the usual cooling fan 38. It will be noted that I have arranged the cleaner with its open end facing the blast produced by the cooling fan as well as by the motion of the vehicle.

It is now apparent that the stream of air directed toward the open end of the casing will strike the deflector 10 tending to throw it toward the periphery of the casing where the blades serve to direct it in a spiral path resulting in the hurling of the heavier particles of dust outwardly so that upon reaching the trap 9 these particles are ejected through outlets 26, the remainder of the air stream continuing in its spiral path to the outlet 30 from which it passes to the carburetor. Thus an efficient air cleaner is provided in which the dust is automatically ejected and in which the restriction to the flow of air is reduced to a minimum. At the same time the cleaner is adapted for manufacture by simple stamping operations and may be very easily assembled.

I claim:

1. The combination of a casing having an open end, a cup-shaped shield for said open end provided with a series of circumferentially spaced slots, air directing blades adapted to space the shield from the casing, said blades having portions adapted to enter said slots and other portions for engagement with the casing to limit the inward movement of the said parts with respect to the casing, and means tending to force said shield toward the casing to hold the parts in assembled relation.

2. In the structure as defined by claim 1, said casing comprising a portion of smaller diameter and a tubular portion of large diameter for engagement with said portion of smaller diameter and with said blades, said last named means comprising a clamping member having engagement with said portion of smaller diameter and with said shield to hold parts in assembled relation.

In testimony whereof I affix my signature.

H. G. KAMRATH.